United States Patent [19]

Godoroja

[11] Patent Number: 5,485,463
[45] Date of Patent: Jan. 16, 1996

[54] SYSTEM FOR TRANSMITTING PAGING SIGNALS USING TIME-DIVISION-MULTIPLEXING

[75] Inventor: Andrei Godoroja, Vancouver, Canada

[73] Assignee: Glenayre Electronics, Inc., Charlotte, N.C.

[21] Appl. No.: 303,348

[22] Filed: Sep. 9, 1994

[51] Int. Cl.$^6$ ................................................ H04Q 7/12
[52] U.S. Cl. ............... 370/95.1; 370/110.1; 340/825.44; 340/825.49; 455/38.1
[58] Field of Search .......................... 370/90, 94.1, 95.1, 370/95.2, 110.1; 379/59, 63; 340/825.44, 825.49, 311.1; 455/33.1, 38.1, 38.2, 38.3

[56] References Cited

U.S. PATENT DOCUMENTS

| | | | |
|---|---|---|---|
| 4,918,437 | 4/1990 | Jasinski et al. | 340/825.44 |
| 4,968,966 | 11/1990 | Jasinski et al. | 340/825.44 |
| 5,042,083 | 8/1991 | Ichikawa | 455/33 |
| 5,081,641 | 1/1992 | Kotzin et al. | 375/1 |
| 5,124,697 | 6/1992 | Moore | 340/825.44 |
| 5,142,279 | 8/1992 | Jasinski et al. | 340/825.44 |
| 5,168,271 | 12/1992 | Hoff | 340/825.44 |
| 5,179,559 | 1/1993 | Crisler et al. | 370/95.1 |
| 5,185,739 | 2/1993 | Spear | 370/95.3 |
| 5,193,091 | 3/1993 | Crisler et al. | 370/95.1 |
| 5,193,223 | 3/1993 | Walczak et al. | 455/115 |
| 5,228,029 | 7/1993 | Kotzin | 370/95.1 |
| 5,369,681 | 11/1994 | Boudreau et al. | 340/825.44 |

OTHER PUBLICATIONS

United States Statutory Invention Registration No. H610 to Focarile et al., dated Mar. 19, 1989.

Primary Examiner—Melvin Marcelo
Attorney, Agent, or Firm—Christensen, O'Connor, Johnson & Kindness

[57] ABSTRACT

A time-division multiplexed paging system for transmitting multiple paging messages on the same frequency. A geographic area is divided into a plurality of cells having base stations that transmit radio frequency signals in the cells. Each base station is assigned a time slot at which paging messages may be transmitted. The assignment is made such that no base stations having overlapping radio frequency coverage areas transmit during the same time. A locate signal is simultaneously broadcast throughout a geographic area in order to locate a paging unit. Upon receipt of the locate signal, the paging unit transmits an acknowledge signal back to the paging system. The cell in which the paging unit is located is determined based upon the signal strength of the received acknowledged signal. A paging message is transmitted from the base station in the cell in which the paging unit is located during the time slot that is assigned to the base station.

19 Claims, 10 Drawing Sheets

SYSTEM FOR TRANSMITTING PAGING SIGNALS USING TIME-DIVISION-MULTIPLEXING

FIELD OF THE INVENTION

The present invention relates to paging systems in general, and in particular to paging systems for transmitting multiple paging signals simultaneously.

BACKGROUND OF THE INVENTION

Paging systems have undergone significant changes in the past twenty years. Early paging units were simple radio receivers that beeped upon receipt of a paging signal. A user wearing the paging unit would then take some predetermined action upon receipt of the paging signal, such as calling a telephone number. The user had no other choice in how to respond when he or she received the paging signal, because the paging signal did not contain any information concerning the nature of the appropriate action to be taken.

With advancements in paging technology, it became possible to send message data to a paging unit. This message data can comprise alphanumeric messages that inform the user who initiated the page or what action to take upon receipt of the paging signal. For example, a message may tell the user to call home, call the office, stop by the dry cleaners, etc. As computer technology advances, future paging units will be able to receive digitized voice messages, thereby acting as answering machines as well as having the capability to transmit data back to a central location—a so-called two-way paging system.

Most modem paging systems use a central computer system that is connected to a public switched telephone network, and a plurality of base stations disposed throughout a geographic area. When the central computer receives a telephone call indicating that a page signal should be transmitted, the central computer assembles a paging message that includes the address of the desired paging unit and the message data. The paging message is then forwarded to each base station where it is simultaneously transmitted, thereby blanketing the geographic area with the paging message. While simulcast paging systems work well to ensure reception of the paging message, they are inefficient because a) only one paging message can be transmitted at a time, and b) the paging message is being broadcast to a far greater area than necessary in order to assure that the message is received. As more users carry paging units, it is desirable that paging systems be developed that can transmit multiple paging messages at the same time.

SUMMARY OF THE INVENTION

The present invention is a system for transmitting multiple paging signals on the same frequency at the same time. A geographic area is divided into a plurality of cells, each of which is serviced by one or more base stations that transmit paging messages into the cell. Each cell is assigned a time slot during which the paging messages are transmitted in the cell. The assignment of time slots is made so that base stations having overlapping radio frequency coverage areas do not transmit at the same time. To transmit a paging message, a locate signal for a particular paging unit is first simultaneously broadcast throughout the entire geographic area. Upon receiving the locate signal, the paging unit transmits an acknowledge signal back to the plurality of base stations. The paging system can determine the cell in which the paging unit is located based upon the strength of the acknowledged signal received at the base station. An offset time is transmitted to the paging unit in order to inform the paging unit what time the paging unit will receive its paging message. The paging system then transmits the paging message to the paging unit from the base station that is closest to the paging unit, i.e., the base station determined to have received the strongest acknowledge signal.

In order to increase the efficiency of the base stations, the base stations can transmit on multiple frequencies during different time slots. Again, the time slots are assigned so that no two base stations having overlapping radio frequency coverage areas transmit on the same frequency at the same time.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
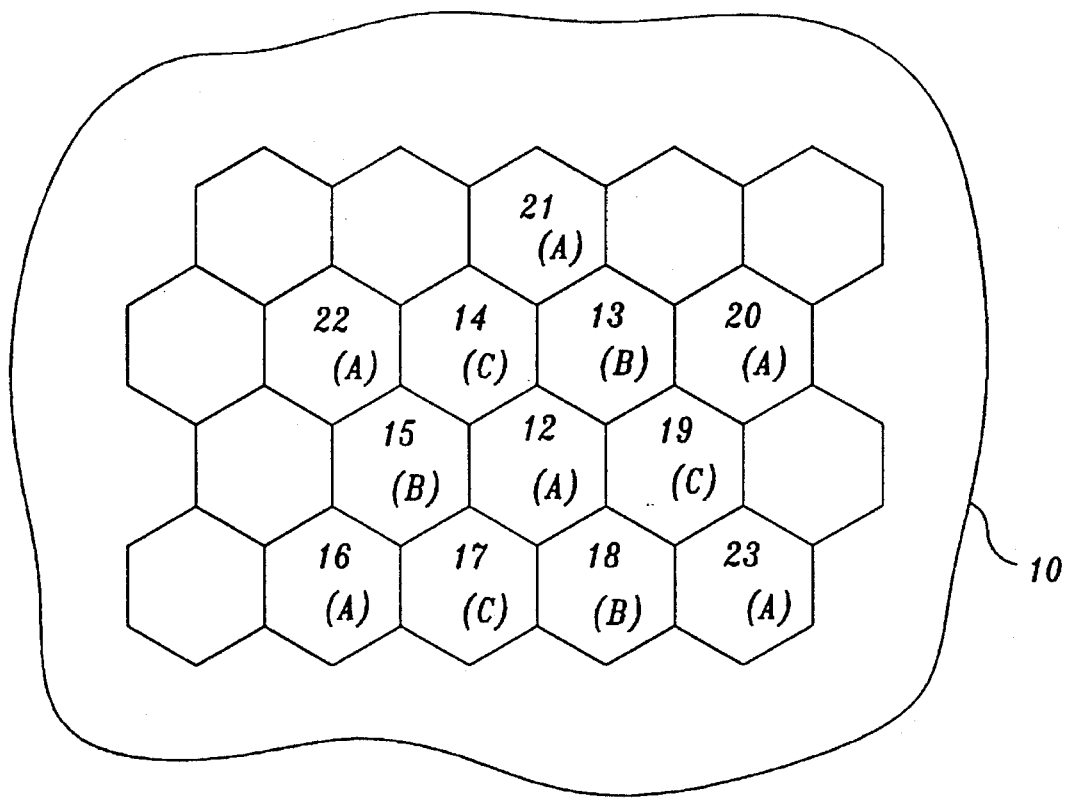
FIG. 1 is a diagrammatic illustration of a cellular frequency reuse pattern of the type used in conventional cellular telephone systems.

The task of transmitting simultaneous signals to multiple receivers within a given geographic area is routinely accomplished in cellular telephone systems using what is generally referred to as "frequency re-use." In a cellular telephone system, a geographical area is divided into a plurality of cells, each cell roughly modeling the radio frequency coverage area of a transceiver located approximately in the center of the cell. The transceiver for each cell is assigned a unique radio frequency that differs from the radio frequencies assigned to the transceivers in the neighboring cells. FIG. 1 shows a simplified example of how this is accomplished.

First, a geographic area 10 is divided into a plurality of cells 12–23, each of which is represented as a regular hexagon. Each cell is assigned one of three sets of radio frequencies labeled A, B, or C. As can be seen in FIG. 1, the assignment of frequencies to each of the cells in the geographic area is made in a repeating pattern that is referred to as a cluster. For example, cells 12, 17, and 18 make up a three-cell cluster. Each cell in the cluster has a unique set of frequencies on which it operates. In order to maximize frequency re-use with the smallest number of frequencies, the number of cells per cluster is kept to a minimum. This minimum is determined by the spacing required between cells of the same frequency set to prevent co-channel interference. In the simplified example shown in FIG. 1, cells that are assigned the same frequency set are not adjacent to one another in order to prevent radio frequency interference between adjacent cells.

In a cellular telephone system, the system first locates the cell in which a user with a mobile telephone is located. Thereafter, transmissions to and from the user take place on one pair of the frequencies that is assigned to the cell. The cellular telephone system is able to handle multiple telephone calls on the same frequencies due to the geographical separation of cells that are assigned the same frequency. Radio frequency transmissions from adjacent cells do not interfere because they are carried on different frequencies.

Unlike cellular telephone systems, paging systems are unable to employ frequency re-use. First, paging technology is presently a one-way service whereby the paging unit receives data but does not transmit. Without transmission from the paging unit, its location cannot be determined and therefore the system must send the message over the entire coverage area in an attempt to guarantee reception by the paging unit. By definition, the frequency is "used" only once per coverage area. In addition, frequency re-use, according to the model employed by cellular telephony, requires many frequency channels to be practical. Paging operators do not have access to multiple channels. In fact, some paging operators have as few as one frequency. Given the fact that current paging units are not capable of transmitting signals and the lack of available paging frequencies, prior art paging systems cannot transmit simultaneous paging messages on the same frequency within a geographic area without co-channel interference.

The present invention is a paging system having the ability to transmit simultaneous paging messages in a geographic area on a single frequency without co-channel interference. To accomplish this, a geographic area is divided into a plurality of cells, each of which roughly defines the radio frequency coverage area of a radio transceiver or base station located within the cell. Each cell is then associated with a time slot during which radio frequency transmissions may occur from the base station in the cell.

Figure 2A:
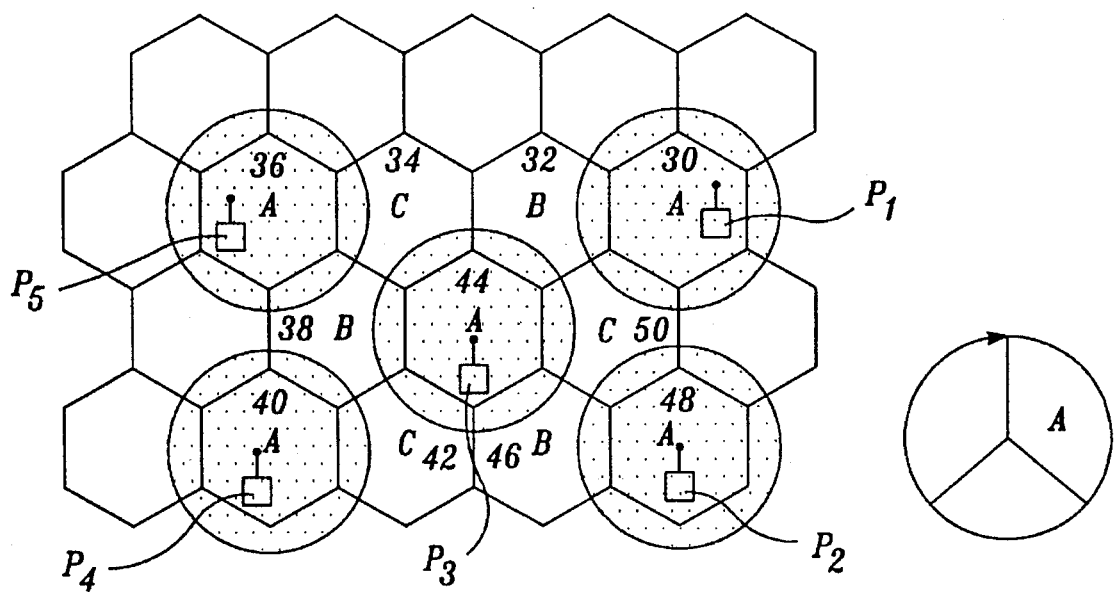
FIGS. 2A–2B is a diagrammatic illustration of time slot reuse patterns used to transmit simultaneous paging signals on the same frequency according to the paging system of the present invention.

FIG. 2A shows a geographic area that is divided into a plurality of cells 30–50. Each cell has a base station (not shown) located within the cell and is assigned one of a plurality of discrete, repetitive, periodic time slots. In the example shown, there are three time slots A, B and C. However, other numbers of time slots such as five, seven, or twelve etc. could also be used. The time slots are assigned to the cells so that adjacent cells have different time slots. Cell 44 is assigned to time slot A while its neighboring cells 32, 34, 38, 42, 46, and 50 are assigned to time slots B, C, B, C, B, and C, respectively. The radio frequency coverage areas for the base stations within the cells 30, 36, 40, 44, and 48 are shown as the generally circular shaded areas and may extend outside the boundaries of the cells. However, as can be seen, no cell assigned the time slot A has a radio frequency coverage area that overlaps with another cell having the same time slot (A).

The base stations located within each of the cells 30, 36, 40, 44, and 48 operate to simultaneously transmit paging messages to paging units within their radio frequency coverage areas. For example, a paging unit $P_1$ is located in a cell 30 that is assigned the time slot A. A paging unit $P_2$ is located in a cell 48 that also is assigned time slot A. Simultaneous paging messages can be transmitted to the paging units $P_1$ and $P_2$ on the same frequency because the radio frequency coverage areas of the transmissions occurring within the cells 30 and 48 do not overlap.

Figure 2B:
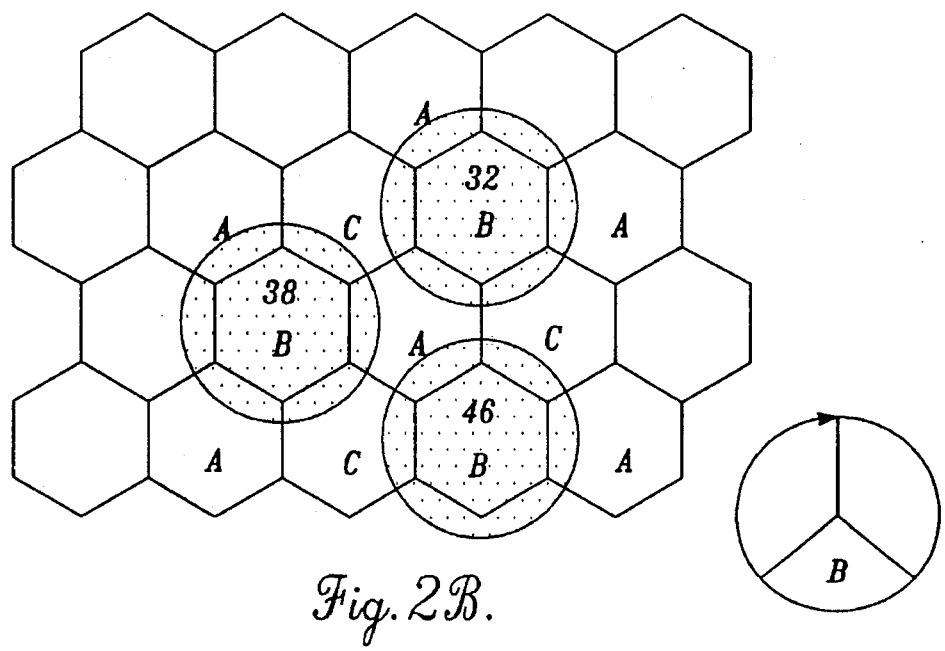

In order to transmit a paging message to a paging unit located anywhere in the geographical area, the base stations assigned to the time slots are sequentially activated. For example, all the base stations located in the cells that are assigned to time slot A are first activated as shown in FIG. 2A. Next, all the base stations located in cells that are assigned to time slot B are activated as shown in FIG. 2B. Similarly, the base stations that are located in cells associated with time slot C would be activated next before the cycle repeats.

Figure 3:
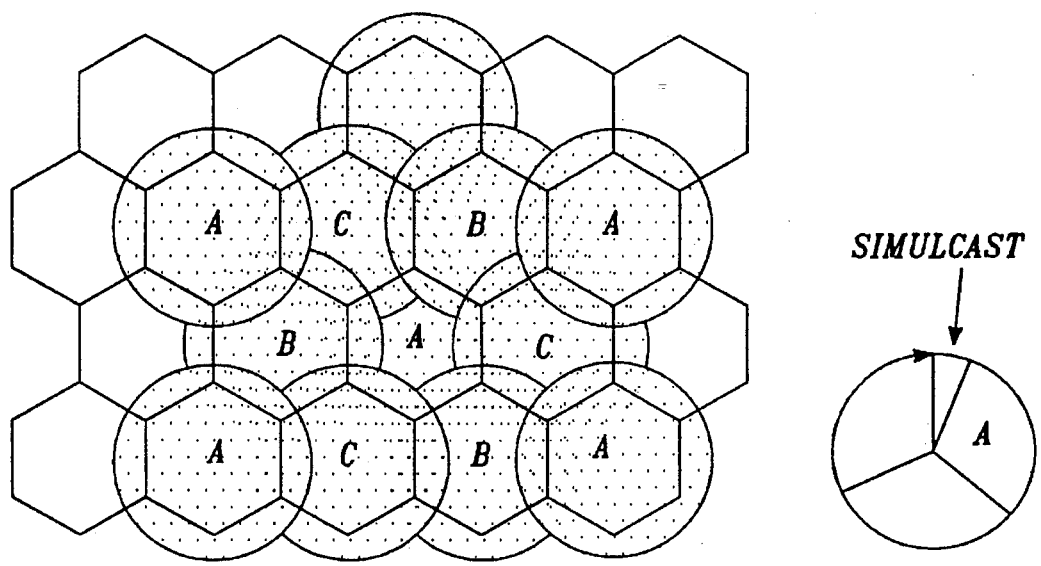
FIG. 3 is a diagrammatic illustration showing how the paging system according to the present invention simultaneously transmits a locate signal to a paging unit.

In order to transmit paging messages to a paging unit from a single base station, it is first necessary to locate the paging unit. In the present invention, this is accomplished by simultaneously broadcasting a "locate" signal from all base stations in the geographic area. FIG. 3 shows the radio frequency coverage area included when all base stations in the geographic area transmit the locate signal simultaneously. The radio frequency coverage areas of all the base stations overlap in order to reach the intended paging unit no matter where in the geographic area the paging unit is located. As will be explained in further detail below, the locate signal uniquely identifies a single paging unit in the geographic area. Once the desired paging unit has received the locate signal, an acknowledge signal must be transmitted from the paging unit back to the paging system. One or more of the base stations receives and analyzes the acknowledge signal for use in determining which base station is closest to the paging unit, in effect determining the cell in which the paging unit is located.

Once the paging system has determined the cell in which the paging unit is located, the paging message is only transmitted to the paging unit from the base station in the time slot associated for the paging unit's cell. Because base stations with overlapping radio frequency coverage areas do not transmit at the same time, multiple paging messages can be simultaneously transmitted on the same frequency to different paging units in non-adjacent cells.

Figure 4:
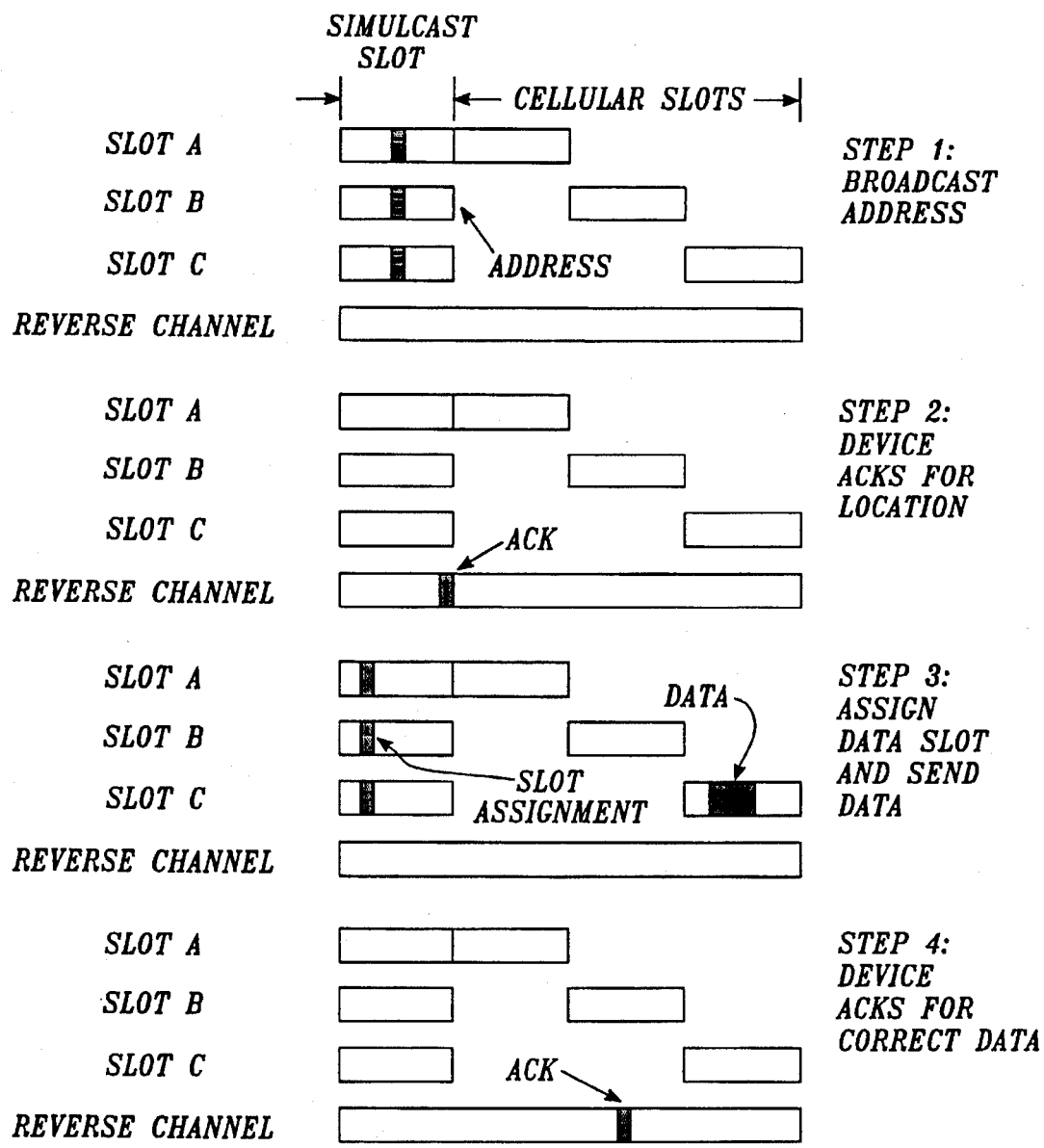
FIG. 4 is a timing diagram showing how data transmissions take place on a forward and a reverse channel between the paging system and a two-way paging unit according to the present invention.

FIG. 4 is a timing diagram showing how data is transferred between the paging system according to the present invention and a paging unit. Data is transmitted to the paging units on a forward channel that is divided into a plurality of time slots. A reverse channel is used to transmit radio frequency signals from the paging unit back to the base stations located within each of the cells. As indicated above, before a paging signal can be sent to a paging unit, the paging unit must be located. At step 1, a locate signal including an address, or other code which uniquely identifies an individual paging unit, is transmitted simultaneously from all the base stations in a geographic area during a simulcast slot. At step 2, the paging unit having the matching address, or code, sends back an acknowledge signal, at a pre-defined time, that indicates it has received the locate signal. As will be described in detail below, the base stations that receive the acknowledge then analyze the received acknowledge signal and transmit the results of the analysis to a cluster controller that votes on the best received signal to determine which base station is closest to the paging unit. The cluster controller therefore identifies the cell in which the paging unit is located based on the quality of the received acknowledge signal. At step 3, a data offset time is simultaneously transmitted to the paging unit. As will be appreciated, the particular offset time transmitted corresponds to the time slot, and therefore the cell in which the paging unit is located. For example, if the paging unit is located in a cell that is assigned to time slot C, the paging unit must be informed that its paging message will be transmitted in the slot C time period. At step 3, the paging message is transmitted to the paging unit from the base station that is within the paging unit's cell. If the paging message is longer than a single time slot, the paging message is broken up into fragments and transmitted during a series of corresponding time slots. At step 4, the paging unit transmits an acknowledge signal (Ack) indicating that the paging message sent during step 3 was received correctly. If the paging message was not received correctly, the paging device can transmit a negative-acknowledge signal (Nak) and that portion of the paging message will be retransmitted during the next time slot for the cell in which the paging unit is located. If the paging message was not received at all, the paging unit would not transmit an acknowledge signal of any type, thereby informing the paging system that the paging message requires retransmission. In general, the location transaction that occurred in steps 1 and 2 does not have to be repeated if the paging message were being retransmitted or if further fragments of the paging message were following.

Figure 5:
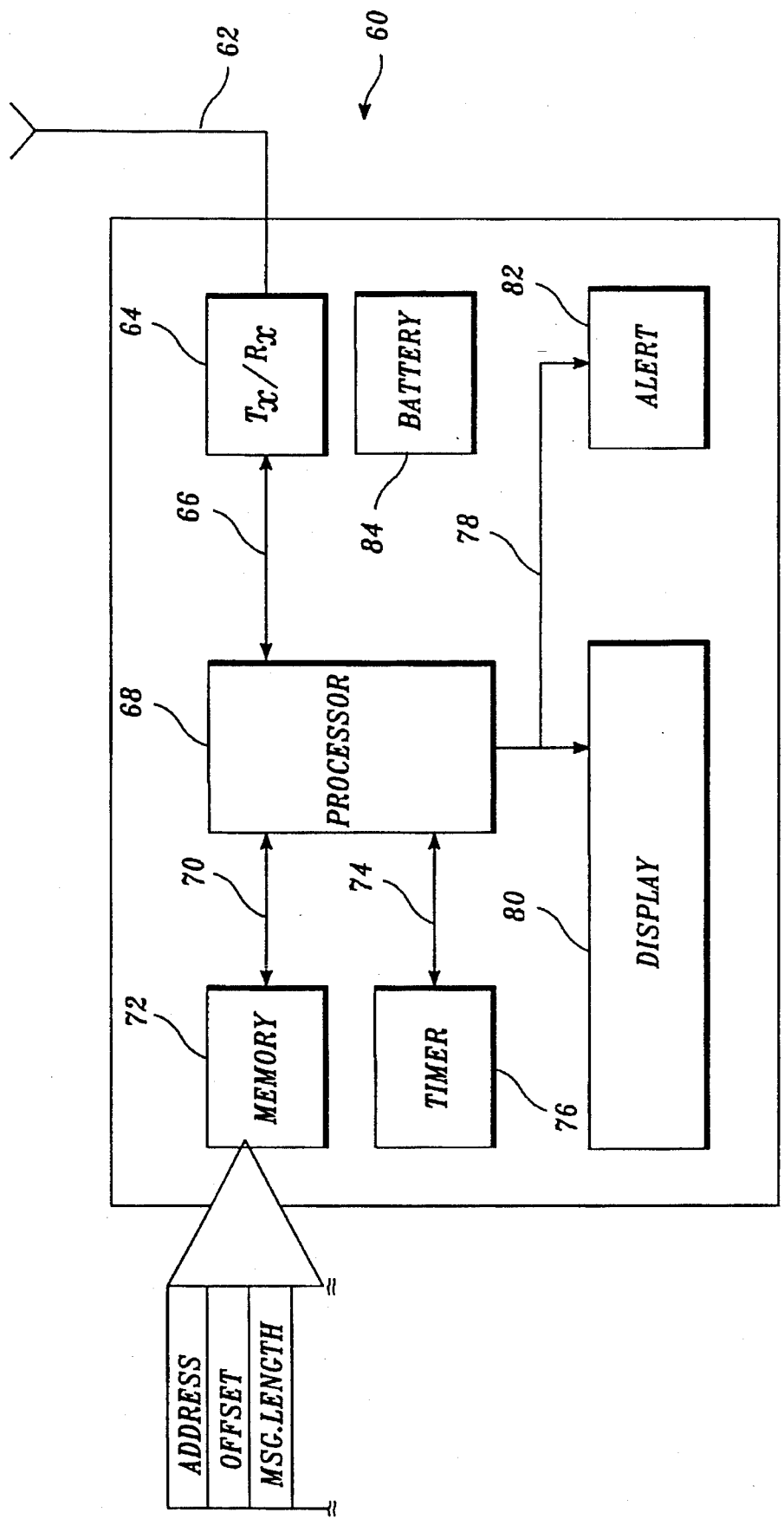
FIG. 5 is a block diagram of a two-way paging unit according to the present invention.

Turning now to the block diagram of FIG. 5, a two-way paging unit 60 according to the present invention includes an antenna 62, a transceiver 64, a microprocessor 68, a memory 72 and a timer 76. The paging unit also includes a display 80 and an alert 82. The microprocessor is coupled to memory 72 via a set of addresses/data leads 70 and to the timer 76 by a set of data leads 74. The display 80 and alert 82 are coupled to the microprocessor via a set of leads 78. The microprocessor can transmit and receive radio frequency signals from the transceiver 64 over a feed line 66. A battery 84 provides electrical power to the paging unit.

The paging unit 60 operates in a manner similar to prior art one-way paging units with the exception that it can transmit signals back to the paging system, and it receives paging signals in a time slot that is selected based on the paging unit's location within a geographic area. As indicated above, the paging unit monitors the forward channel during the simulcast time slot to determine if the paging unit's address has been transmitted. Upon receipt of an address during the simulcast time slot, the paging unit compares the received address with its own address that is stored in the memory 72. When the paging unit receives its own address, it transmits an acknowledge signal back to the paging system during a pre-defined time period. In the following simulcast time slot, the paging unit's address will again be transmitted along with an offset time code. The offset time code indicates the time between the start of the simulcast slot and the beginning of the paging message for the paging unit. The offset time code is stored in the paging unit's memory 72. Upon receipt of the offset time code indicating the time at which the paging message will be sent, the paging unit uses the timer 76 to time a period equal in length to the value of the offset time code minus the accumulated time of the simulcast slot. When the timer times the calculated offset period, the microprocessor begins reading the data transmitted on the forward channel in order to read its paging message.

The display 80 and alert 82 are activated by the microprocessor 68 when a message has been received. For example, the paging message may be shown on the display 80 for a user's viewing, and the alert 82 may beep or vibrate indicating to the user that a page signal has been received. In the presently preferred embodiment of the invention, the alert is not activated until the entire message has been received. As indicated above, if the paging message transmitted to the paging unit is longer than a single time slot or the maximum allowed message fragment length, it may be necessary to receive the paging message in multiple fragments. Therefore, the paging unit does not inform the user that a paging message has been received until the entire paging message has been correctly received.

Each message fragment is accompanied by a serial number that is incremented by one following correct transmission of the message fragment. As well, each message fragment is accompanied by a bit that indicates that this fragment is the last fragment of a complete paging message. Therefore, a message that fits within one fragment always has it "last fragment bit" set. If the pager receives a fragment with this bit not set, it is an indication that more fragments are to follow before the paging message is complete. In this way, the pager can determine if any fragment is missing and the paging message received is incomplete.

Figure 6:
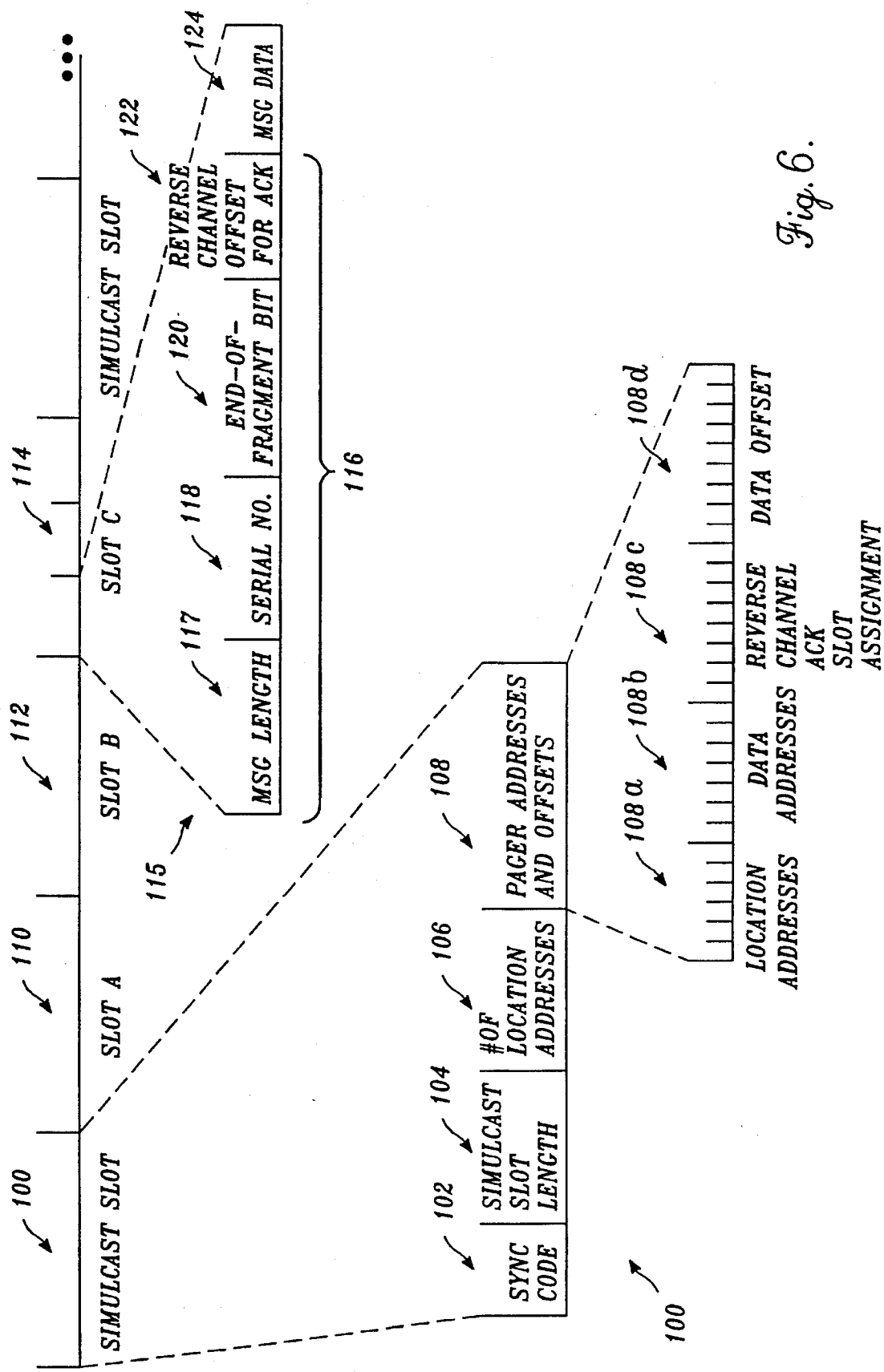
FIG. 6 is a timeline illustration showing the structure of the data transmitted during a simulcast time slot and a data time slot.

FIG. 6 shows the structure of the data transmitted by the paging system on the forward channel. As indicated above, a simulcast time slot 100 is followed by a series of data time slots 110, 112, and 114, containing paging messages. After the last data time slot, another simulcast time slot is transmitted and the cycle repeats. The simulcast time slot 100 is broken up into several sections. At the beginning of the simulcast time slot, a synchronize code 102 is transmitted that allows each of the paging units to synchronize itself to the data stream. The synchronize code not only marks the beginning of the synchronize time slot but may also be used by the paging unit to adjust its internal timer. Immediately following the synchronize code 102 is a simulcast time slot length code 104 which specifies the length of the simulcast time slot. The length of the simulcast time slot may vary depending upon the number of locate signals, and offset time codes transmitted. Following the simulcast time slot length code 104, is a code 106 that indicates the number of location addresses to be transmitted. This code, 106, is used by the paging unit to determine how long it needs to monitor the forward channel for its address. The simulcast time slot continues with a series of pager addresses and offsets 108 that indicate the time at which the paging unit is to transmit its acknowledge signal and look for its paging message on the forward channel.

The paging address and offset data 108 are further broken up into a series of sub-sections. The address of each paging unit to be located is transmitted during subsection 108a. The number of addresses transmitted in subsection 108a is the same as that indicated by the number in code 106 described above. The paging unit therefore monitors the forward channel until it receives a number of addresses equal to the number specified by the code 106. If the paging unit's address is not transmitted by the time the last address is transmitted in subsection 108a, a paging unit knows that no further data will be transmitted to it in the simulcast slot, and therefore the paging unit need not monitor the forward channel until the next simulcast time slot.

If a paging unit's address is transmitted in the subsection 108a, then the paging unit knows it will receive its reverse channel acknowledge slot assignment in a subsection 108c. For example, if the paging unit's address was the third address transmitted in the subsection 108a, then the reverse channel acknowledge slot assignment will be the third such slot assignment transmitted in subsection 108c. In this way, the paging unit is able to read the correct reverse channel acknowledge slot assignment.

The reverse channel acknowledgment slot assignment is transmitted to the paging unit so that no two paging units will transmit acknowledge signals at the same time on the reverse channel. Furthermore, the paging system will know when to expect an acknowledge signal from the paging unit and can identify a paging unit by recording the time at which its acknowledge signal is received.

Once a paging unit receives the reverse channel acknowledge slot assignment and has transmitted the acknowledge signal at the appropriate time, it monitors the forward channel for a data offset which indicates the time at which its paging message will be transmitted. The paging unit knows that the data offset will be transmitted during the next simulcast time slot. Therefore, it monitors subsection 108b for its address. It then monitors subsection 108d for a data offset to be transmitted. Again, if the paging unit's address is the second one transmitted in subsection 108b then its data offset will be the second data offset transmitted in subsection 108d. If the paging unit does not receive its address in subsection 108b for a specified number of simulcast slots, it will assume an error and revert to looking for its address in subsection 108a.

The data time slots 110, 112 and 114 contain one or more message fragments 115. Each message fragment 115 is further divided into a plurality of sections. The first four sections of the message fragment 115 comprise a message header 116 that indicates several message parameters. These message parameters include a message length code 117 that indicates the length of the message fragment transmitted in the data time slot. Following the message length code 117 is a serial number code 118 that indicates which fragment of a paging message a paging unit is receiving. The serial number code is incremented during each transmission so that the paging unit can detect if it has missed a fragment. Following the serial number code 118 is an end-off fragment bit 120 that indicates to the paging unit that the message fragment being transmitted is the last fragment of a paging message. If this bit is not set, the paging unit knows that more fragments will be transmitted to complete the message.

Following the end-of-fragment bit 120 is an offset 122 that indicates the time at which the paging unit is to transmit its acknowledge signal indicating that the message fragment has been properly received. The offset 122 is transmitted to the paging unit so that no two paging units will transmit acknowledge signals at the same time on the reverse channel. After the offset 122 is transmitted, the paging message data is transmitted in a section 124. Upon receipt of the paging message data, the paging unit will determine if it has received the data correctly and, if so, transmit an acknowledge to the paging system during the time specified by the offset 122 described above. If the paging message is too long to be transmitted as a single fragment, the message will be divided into a plurality of fragments. These fragments may be transmitted during successive data time slots or may be transmitted during a single data time slot. If a paging unit is to receive more than a single fragment during a data time slot, the pager's address would be transmitted during the subsection 108b one time for each fragment the paging unit was to receive. For example, if a paging unit is to receive two fragments during the same data time slot, then the paging unit's address would be transmitted twice during the subsection 108b along with two data offsets transmitted in subsection 108d.

The data offset transmitted in the subsection 108d defines the time between some predefined starting point such as the beginning of the synchronize code 102, described above, and the beginning of the message fragment 115. For example, if the simulcast time slot is 200 milliseconds long and each of the data time slots is 500 milliseconds long, and the paging unit is to receive its paging message as the first message fragment in data time slot C, then the offset specified in subsection 108d will be set to 1200 milliseconds plus some small additional amount to account for base station power-up delay time. All the data transmitted during the simulcast or data time slots includes appropriate forward-error-correction codes well-known to those of ordinary skill in the art of radio data communications.

Figure 7:
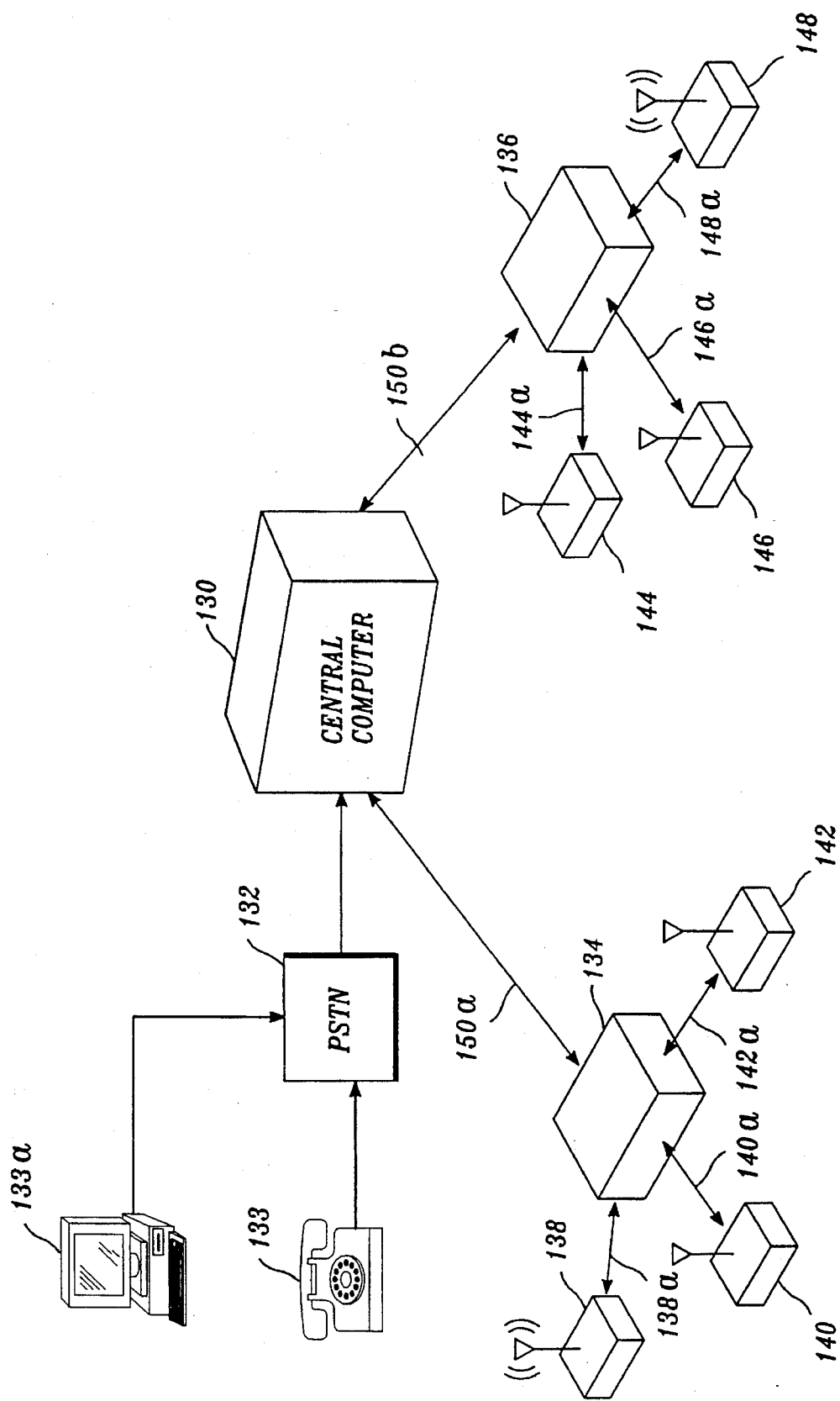
FIG. 7 is a diagram of the major hardware components of the paging system according to the present invention.

A diagram showing the major components of the paging system according to the present invention is shown in FIG. 7. The paging system includes a central computer system 130 that is coupled to a public switched telephone network 132. The public switched telephone network 132 is the interface between a telephone 133 in the case of voice messages, or a computer system 133a in the case of data messages. The central computer operates to receive data that is to be included in a paging message from the public switched telephone network, and to transmit the paging message to a plurality of cluster controllers 134, 136. The cluster controllers route data to the base stations that transmit the paging messages within each of the cells as described above, and receive the acknowledge signals transmitted from the paging units back to the base stations. The central computer system 130 is coupled to the cluster controllers 134 and 136 via dedicated communication links 150a, 150b respectively. These communication links may be either leased telephone lines, microwave links, satellite links or other suitable communication paths.

A plurality of base stations 138–148 are coupled to the cluster controllers 134–136 via their own dedicated communication links. The base station 138 is coupled to the cluster controller 134 via a communication link 138a, while the base stations 140 and 142 are coupled to the duster controller 134 via communication links 140a and 142a. The base stations 144, 146 and 148 are coupled to the cluster controller 136 via communication links 144a, 146a and 148a. Each cluster controller controls a number of base stations equal to the number of cells in the cluster. In the example shown in FIG. 7, each cluster controller controls three base stations, thereby indicating that each cluster in the paging system comprises three cells.

Figure 8:
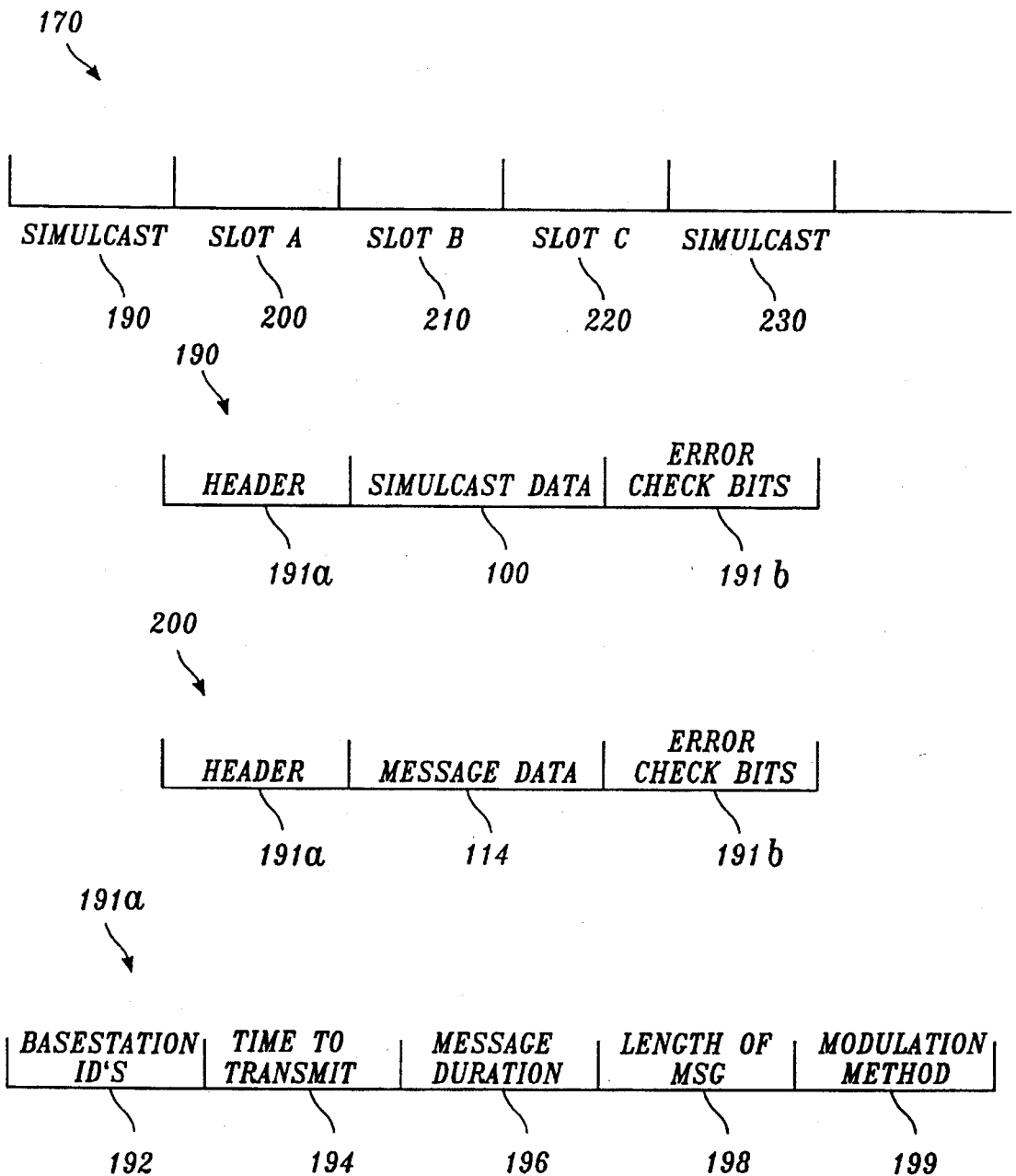
FIG. 8 is a diagrammatic illustration showing the structure of the data transmitted from a central computer system to a plurality of cluster controllers.

The structure of the data transmitted from the central computer system to the cluster controllers is shown in FIG. 8. The data is sent as a stream of packets 170, each packet corresponding to either the simulcast data or the time slot data.

A simulcast packet 190 is used by the cluster controller to broadcast the locate and offset signals to the paging units.

The simulcast packet 190 includes a header 191a, the data to be transmitted during the simulcast time slot 100 as described above and shown in FIG. 6, and one or more error checkbits 191b. The error checkbits allow the base station to confirm correct reception of the data transmitted in the simulcast time slot 100.

The header 191a further includes one or more base station IDs 192 that indicate which base stations are to transmit the packet. The simulcast packet is designed to be transmitted over the entire geographic area at the same time. In the presently preferred embodiment of the invention, the base station ID's 192 identify all the base stations coupled to a cluster controller. However, if the entire geographic area could be covered with fewer than all base stations transmitting, then the base station ID's 192 would only identify those stations required to blanket the geographic area. Following the base station IDs 192 is a code 194 that indicates the time at which the data in the simulcast time slot 100 is to be transmitted. Each base station includes a very accurate clock by which the correct time for transmitting the data in the simulcast time slot 100 is determined. Following the time code 194 is a code 196 that indicate the duration of the simulcast time slot 100. Alternatively, code 196 could be the end time or the bit rate of simulcast time slot 100. Following the code 196 is a length of message code 198 that indicates the length of data transmitted during the simulcast time slot 100 in bits. The code 198 informs the base stations where the data in simulcast time slot 100 ends and where the error checkbits 191b begin. Following the code 198 is a code 199 that indicates the type of radio frequency modulation to be used by the base station to transmit the simulcast time slot data during the simulcast time slot 100.

The data time slot packets 200, 210, 220 are similar to the simulcast packets 190. A data time slot packet 200 contains a header 191a similar to that described above, except the header 191a describes the data in the data time slots 110, 112, or 114. As will be appreciated, the base station IDs specified for a data slot packet will only specify a single base station.

The length of the simulcast packet 190 and the data time slot packets 200, 210, and 220 vary depending on the instantaneous demand of the paging system. The data in the simulcast time slot 100 only contains addresses for paging units being located or being sent paging messages. The data time slots 110, 112, and 114 are normally approximately equal in length, but can be varied to adapt to uneven distribution of paging units. For instance, if there are more paging units receiving data in one cell, then the length of a specific data time slot, either 110, 112, or 114, may be increased and the others decreased. Additionally, the order of transmission or sequence of the data time slots 110, 112, or 114 may be changed if there is a paging unit in one particular cell that requires higher priority of message delivery. As can be appreciated, all clusters in the geographic area will have to transmit from the cells in the same order to prevent co-channel interference.

Figure 9:
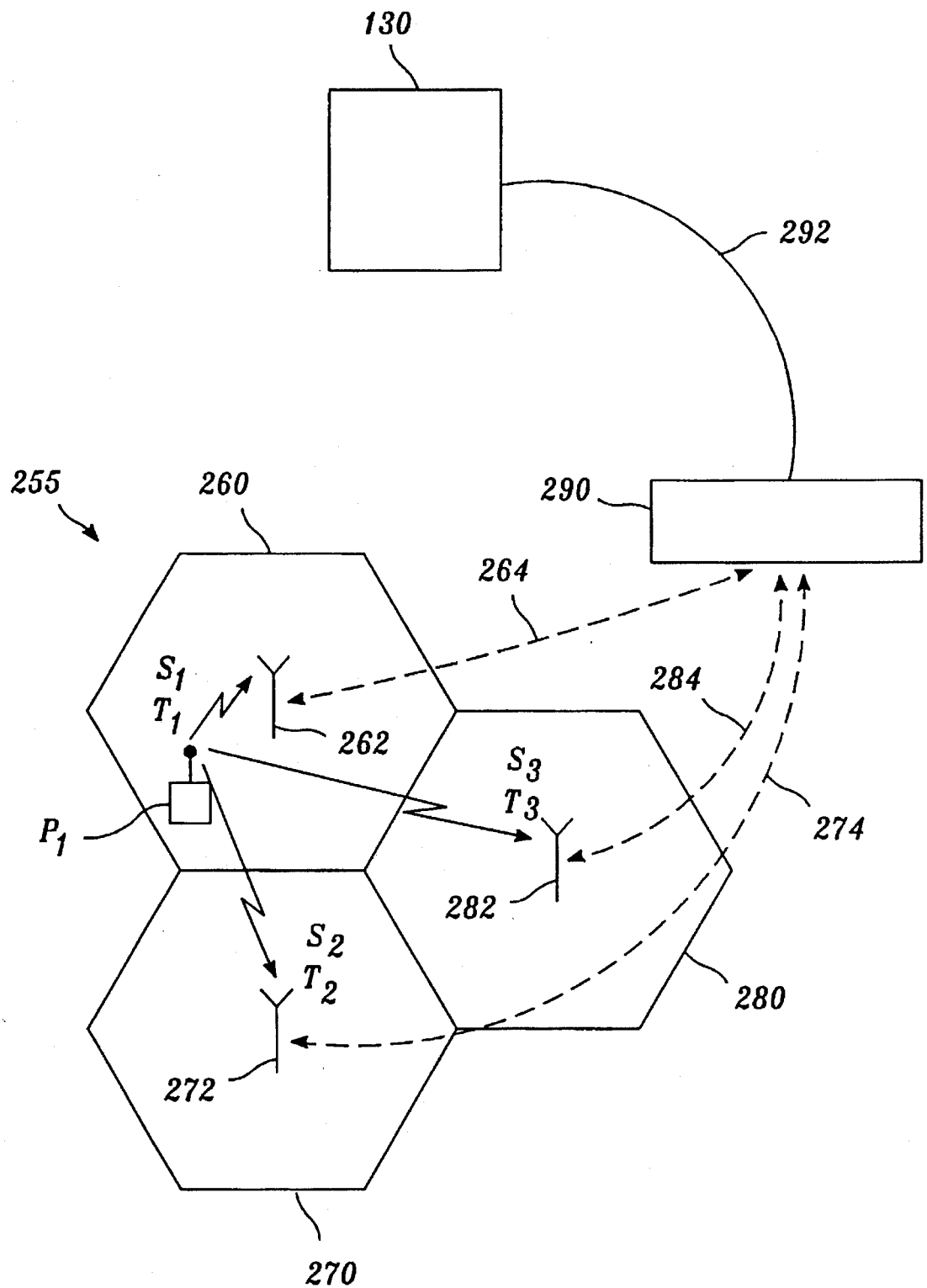
FIG. 9 is a diagrammatic representation of a paging unit in a group of cells showing how the present invention determines the cell in which the paging unit is located.

Turning now to FIG. 9, the way in which the present invention determines the location of a paging unit is shown. A cluster of cells 255 contains cells 260, 270, and 280. The cell 260 includes a base station 262 that transmits radio frequency signals in the cell. Similarly, cells 270 and 280 include base stations 272 and 282 respectively. Base station 262 is coupled to a cluster controller 290 via a communication link 264 while the base stations 272 and 282 are connected via communication links 274 and 284. In the example shown, a paging unit $P_1$ is located in cell 260. As described above, after transmitting the locate signal, the paging unit transmits its acknowledge signal during its pre-assigned time period. The acknowledge signal is a distinctive pattern of bits that enables the base stations to determine the time of transmission even if some bits are poorly received. Each of the base stations 262, 272, and 282 includes a receiver that can measure the strength at which it receives signals. The receiver is also coupled to an accurate time reference, such the Global Positioning Satellite system, to measure the time at which the signals arrive. The base station 262 receives the acknowledge signal with a signal strength $S_1$ at a time $T_1$. Similarly, the base station 272 receives the acknowledge signal with a signal strength $S_2$ at a time $T_2$. Finally, the base station 282 receives the acknowledge signal with a signal strength $S_3$ at a time $T_3$. Each base station forwards the signal strength and time information to the cluster controller 290. The cluster controller 290 uses the signal strength to select the base station that is presumed to be closest to the paging unit. Typically, the base station with the strongest signal strength is selected. In the case of two base stations receiving the acknowledge signal with equal signal strength, the base station receiving the acknowledge signal first is selected. The cluster controller 290 forwards the signal strength and time indication from the selected base station to the central computer system 130. The central computer system receives such information from all cluster controllers connected to base stations that received the acknowledge signal from the paging unit. The central computer system 130 then decides which base station is closest to the paging unit using the signal strength and time criteria. In addition to the signal strength, each base station determines the quality of the acknowledge signal (i.e., how many bits were received correctly). This information can be forwarded to the cluster controller for use either alone or in combination with the signal strength and/or the time of receipt as the criteria by which the closest base station to the paging unit is selected.

Figure 10A:
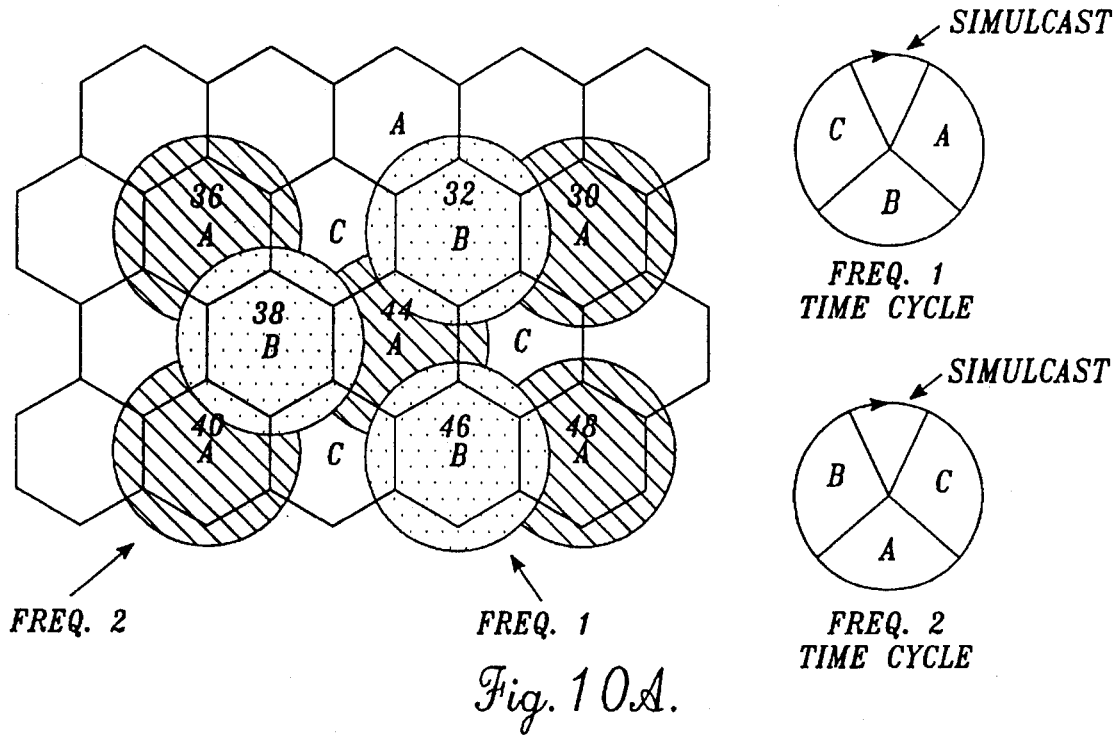
FIGS. 10A and 10B are diagrammatic illustrations showing how multiple frequencies are used to increase the efficiency of a base station according to another aspect of the present invention.
Figure 10B:
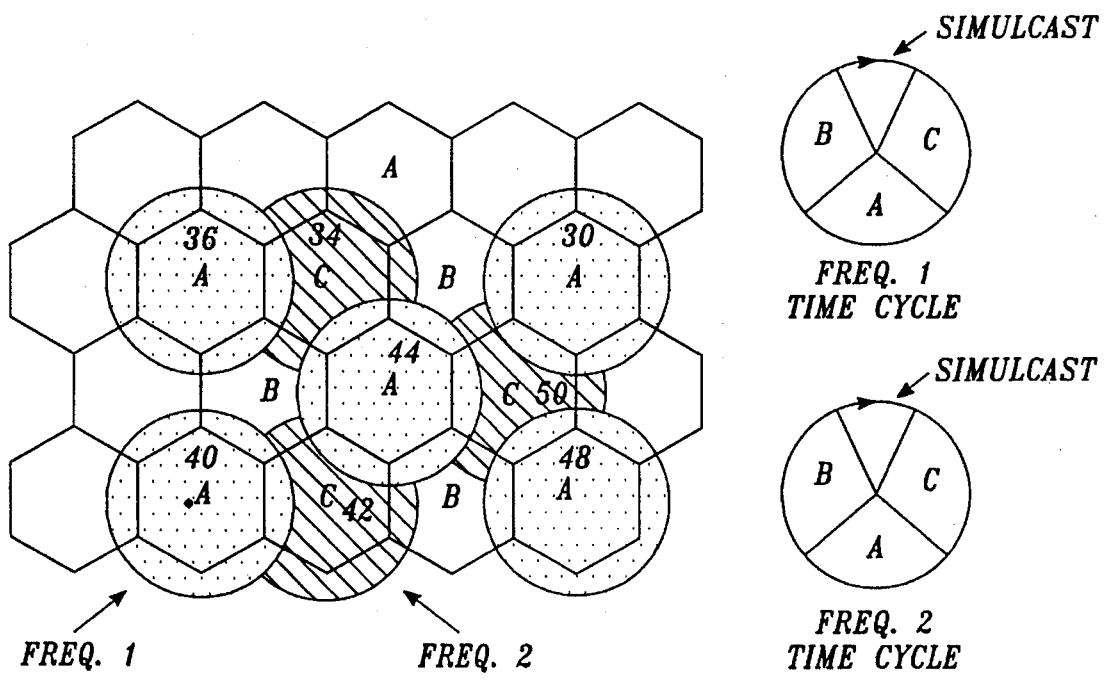

As can be appreciated, a base station operating in the manner described above remains idle when not transmitting data during the simulcast slot or its assigned data time slot. For example, if a paging system has clusters having three data time slots, a base station will remain idle for approximately two-thirds of the time. One way to increase the efficiency of the base stations is for each base station to transmit data on another frequency during its idle time. FIGS. 10A and 10B show how this is accomplished in a second embodiment of the paging system of the present invention.

FIG. 10A shows the radio frequency coverage of eight base stations transmitting paging messages at the same time. The base stations in cells 32, 38 and 46 are transmitting paging messages during data time slot B on a first frequency $F_1$ in the manner described above. However, instead of remaining idle during data time slot B, the base stations in cells 30, 36, 40, 44, and 48 (which were dedicated to data time slot A in the previously described embodiment) transmit paging messages on a second frequency $F_2$ during the same data time slot B. The second frequency $F_2$ could be another paging channel, or could be derived from splitting the original frequency $F_1$ into two or more sub-channels. The information concerning which frequency a base station is to use while transmitting is sent from the central computer to the cluster controllers. The frequency information is transmitted to the cluster controllers on the communication link described above. Because the frequencies $F_1$ and $F_2$ are different, there will be no co-channel interference between cells with overlapping radio frequency coverage areas despite simultaneous paging messages being transmitted in the same time slot.

FIG. 10B shows the radio frequency coverage area of eight base stations transmitting paging messages at the same time. The base stations in cells 30, 36, 40, 44 and 48 are transmitting paging messages during data time slot A on the first frequency $F_1$. The base stations in cells 34, 42 and 50 (which were dedicated to time slot C in the previously described embodiment) are simultaneously transmitting paging messages on the second frequency $F_2$ in the same data time slot. A base station that is assigned data time slot A therefore transmits on frequency $F_1$ during data time slot A, on frequency $F_2$ during data time slot B and remains idle during data time slot C. If 100% of the base station is desired, a third frequency could be added. As will be appreciated, the effect of adding multiple frequencies to the paging system is to add a phase-shifted time-division multiplexed scheme on top of the time slots for the first frequency. In general, if there are n time slots, a base station can transmit paging messages on n frequencies. When the number of frequencies equals the number of data time slots, the transmitter can be used at 100% efficiency.

The system shown in FIGS. 10A and 10B assumes one simulcast time slot for two frequencies. Therefore, all paging units must be on the same frequency to receive the simulcast data. To work in such a system, the paging unit must receive an indication of the frequency on which its paging message will be sent as well as the time at which it will be sent. Therefore, the paging units have frequency agile receivers that can change the frequency on which signals are received.

Alternatively, the system can be implemented with paging units that receive signals on a single frequency. To accomplish this, multiple simulcast time slots are provided, one for each frequency. The simulcast time slot for each frequency would be transmitted at a pre-defined time, such as always before data time slot A for that frequency. The paging units are preferably designed to monitor one frequency only and therefore are unaware of transmissions that occur on other frequencies.

Figure 11A:
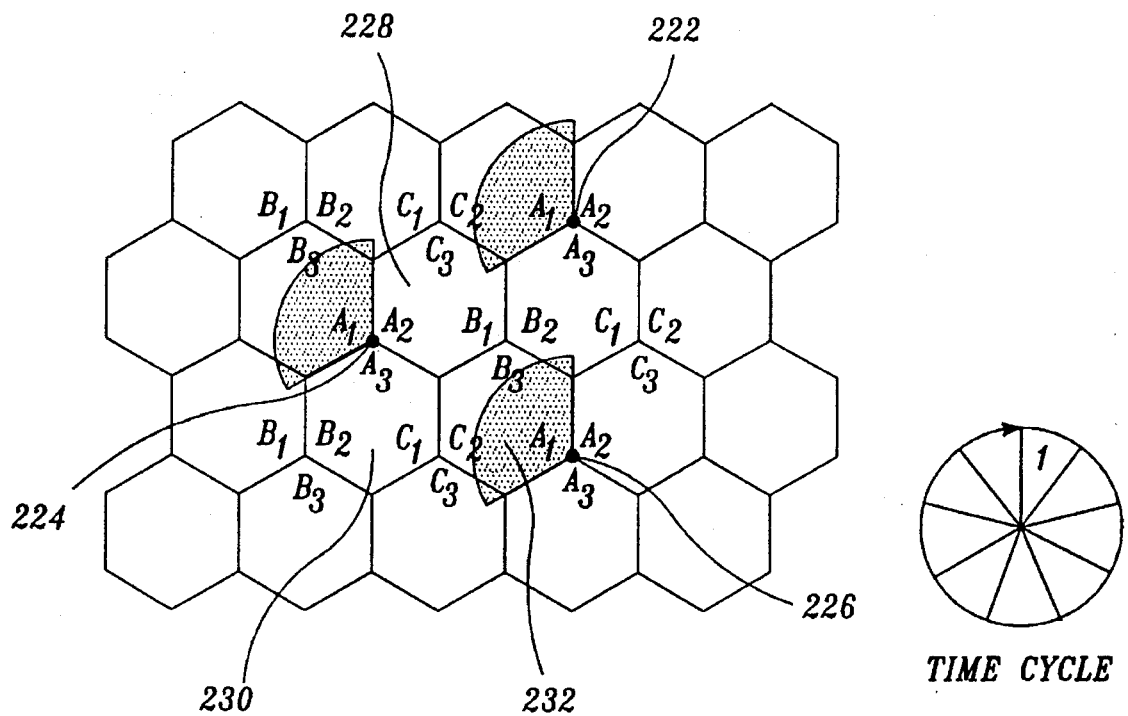
FIGS. 11A and 11B are diagrammatic illustrations showing how the time-division multiplexed paging system according to the present invention is implemented with comer-activated base stations.

A paging system according to the present invention can also be implemented with "corner-activated" base stations. Most modem cellular telephone systems use corner-activated cells because they reduce the number of cells per cluster. A similar result can be achieved using corner-activated cells in the paging system of the present invention. FIG. 11A shows a plurality of cells having corner-activated base stations instead of center-activated base stations as described above. For example, three base stations 222, 224, and 226 are shown transmitting during the same data time slot. Each base station has one or more sectorized antennas each of which covers approximately 120°. Each base station can transmit radio frequency signals through any or all of its sectored antennas at any given time.

In order to implement the paging system according to the present invention with corner-activated cells, each sector of the antenna is assigned a data time slot during which signals may be transmitted. Base stations that transmit signals at the same time are spaced apart geographically so that their radio frequency coverage areas do not overlap. In the example shown in FIG. 11A, the geographic area is broken up into clusters of three cells. An example of a single cluster includes cells 228, 230 and 232. In order to transmit radio frequencies throughout the entire cluster area, nine time slots are required. These time slots are labeled $A_1$ which transmits in cell 232, $A_2$ which transmits in cell 228, $A_3$ which transmits in cell 230, $B_1$ which transmits in cell 228, $B_2$ which transmits in cell 230, $B_3$ which transmits in cell 232, $C_1$ which transmits in cell 230, $C_2$ which transmits in cell 232, and $C_3$ which transmits in cell 228.

Figure 11B:
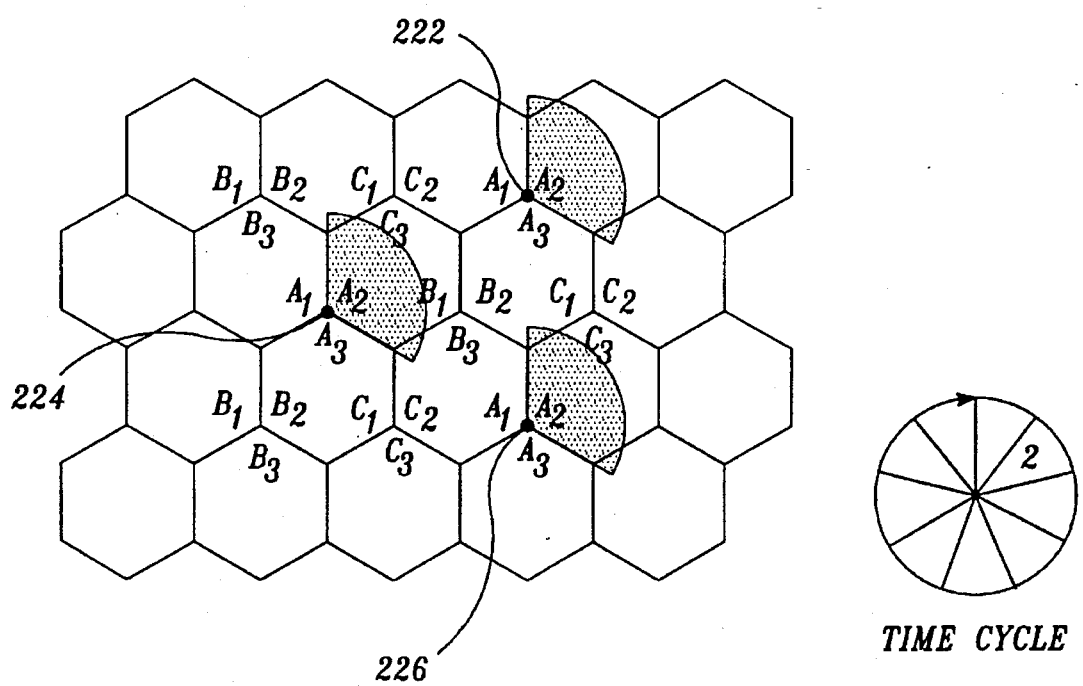

In operation, the time-division multiplexing system using corner-activated cells operates in the same manner as the center-activated cells described above. A locate signal is simulcast from each corner-activated base station in all directions so as to blanket the geographic area. Upon receipt of the locate signal, the paging unit then responds by transmitting its acknowledge signal, which is received by the sectored antennas of the corner-activated base stations. Based on the signal strength of the acknowledge signal and other information as described above, the paging system determines which corner-activated cell is closest to the paging unit. The paging message is then sent to the paging unit in the time slot that is associated with the sectored antenna of the corner-activated cell closest to the paging unit. As can be seen in FIG. 11A, different paging messages can be transmitted simultaneously in the same time slot to multiple paging units in different cells by ensuring that the radio frequency coverage area of the base stations transmitting the paging messages do not overlap. For example, FIG. 11A shows the radio frequency coverage area of the base stations 222, 224, and 226 during the time slot $A_1$. Because the radio frequency coverage areas of the base stations do not overlap, simultaneous paging messages can be transmitted to a paging unit in each of these radio frequency coverage areas. FIG. 11B shows the radio frequency coverage area of the base stations 222, 224, and 226 transmitted during time slot $A_2$. In a similar fashion, multiple paging messages can be transmitted during each of the time slots $A_3$, $B_1$, $B_2$, $B_3$ and $C_1$, $C_2$, and $C_3$.

As can be seen, the paging system of the present invention allows multiple paging messages to be transmitted simultaneously on the same frequency. By ensuring that no two base stations transmit radio frequency paging message signals in the same coverage region at the same time, co-channel interference is avoided.

While the preferred embodiment of the invention has been illustrated and described, it will be appreciated that various changes can be made therein without departing from the spirit and scope of the invention. It is therefore intended that the scope of the invention be determined solely from the following claims.

The embodiments of the invention in which an exclusive property or privilege is claimed are defined as follows:

1. A method for simultaneously transmitting paging messages on a single frequency to two or more paging units within a geographic area that is divided into a plurality of cells, comprising the steps of:

synchronizing a plurality of transmitters in the geographic area to a common, repetitive time base;

dividing the time base into a plurality of discrete time slots;

preassigning each cell one of the plurality of discrete time slots during which radio frequency signals are transmitted in the cell, wherein the time slots are assigned to the cells such that cells assigned the same time slot are sufficiently spaced apart geographically such that signals transmitted on the same radio frequency during the same time slot do not interfere;

transmitting a locate signal within all of the cells to the two or more paging units in the geographic area;

transmitting an acknowledge signal from the paging units upon receipt of the locate signal;

receiving the acknowledge signals from the two or more paging units and determining from the acknowledge signals the cells in which the two or more paging units are located; and simultaneously transmitting the paging messages to the two or more paging units from the synchronized transmitters if the two or more paging units are located in different cells that are assigned the same time slot.

2. The method of claim 1, wherein the number of time slots is less than the number of cells in the geographic area such that more than one cell is assigned the same time slot.

3. The method of claim 1, wherein the locate signal is simultaneously transmitted throughout the geographic area.

4. The method of claim 1, further comprising the steps of determining if the paging message is longer than a single time slot and if so, transmitting the paging message during multiple repetitions of the cell's preassigned time slot.

5. The method of claim 1, further comprising the step of preassigning each cell a second of the plurality of discrete time slots during which signals are transmitted in the cell on a second frequency, wherein the second time slots are preassigned to the cells such that cells preassigned the same second time slot are sufficiently spaced apart geographically such that signals transmitted on the second radio frequency during the same time slot do not interfere.

6. The method of claim 1, further comprising the step of transmitting to the paging units an offset time(s) that indicates the time(s) at which the paging messages will be transmitted to the paging units.

7. The method of claim 1, wherein the step of transmitting at least one of the paging messages to the paging units further comprises the steps of:

receiving the paging message to be transmitted to such at least one paging unit;

dividing such paging message into two or more fragments such that each fragment can be transmitted during a single repetition of a time slot; and sequentially transmitting each fragment of the paging message during different repetitions of the time slot that is assigned to the cell in which such at least one paging unit is located.

8. The method of claim 1, wherein each cell is associated with a base station that transmits paging messages in the cell and receives acknowledge signals from paging units within the cell, the method further comprising the steps of:

receiving an acknowledge signal transmitted from a paging unit by a plurality of base stations located throughout the geographic area;

determining the signal strength for the acknowledge signal received at each of the base stations; and determining the cell in which the paging unit is located by selecting the base station that has received the acknowledge signal with the strongest signal strength.

9. The method of claim 1, wherein the time slot assigned to a cell may be modified based on the number of paging messages to be transmitted.

10. A method of operating a paging system to transmit simultaneous paging messages to two or more paging units located within a geographic area serviced by the paging system, comprising the steps of:

synchronizing a plurality of transmitters in the geographic area to a common, repetitive time base;

dividing the time base into a plurality of discrete time slots:

preassigning each transmitter in the geographic area one of the plurality of discrete time slots during which the transmitter transmits radio frequency signals to a paging unit, wherein the preassignment is made such that simultaneous radio frequency transmissions do not interfere:

locating the two or more paging units within the geographic area; and transmitting the paging messages to the two or more paging units from separate base stations, each base station transmitting a paging message to a single one of the two or more paging units during one or more intervals of the transmitters preassigned time slot.

11. The method of claim 10, wherein the step of locating the two or more paging units within the geographic area further comprises the steps of:

transmitting a locate signal that uniquely identifies the two or more paging units throughout the geographic area;

receiving the locate signal at the two or more paging units;

transmitting an acknowledge signal from the two or more paging units indicating that the locate signal was received;

receiving the acknowledge signals at a plurality of base stations disposed throughout the geographic area; and analyzing the received acknowledge signals to determine the base stations that are closest to the two or more paging units.

12. The method of claim 11, wherein the step of analyzing the received acknowledge signals further comprises the step of:

determining the signal strength at which each of the base stations receives the acknowledge signals.

13. The method of claim 11, wherein the step of analyzing the received acknowledge signal further comprises the step of:

determining the time at which each base station receives the acknowledge signals.

14. The method of claim 11, wherein the step of analyzing the received acknowledge signal further comprises the step of:

determining the number of errors in the acknowledge signals received by the base stations.

15. The method of claim 10, wherein the step of transmitting the paging messages further comprises the step of:

transmitting to the two or more paging units an offset time(s) that indicates the time slot(s) during which the paging messages will be transmitted.

16. The method of claim 11, wherein the acknowledge signal transmitted by the two or more paging units is carried on a reverse channel, the method further comprising the step of:

transmitting to the two or more paging units an indication of the time at which the two or more paging units are to transmit the acknowledge signals on the reverse channel.

17. A paging system for transmitting paging message signals on a single frequency to multiple paging units located throughout a geographic area, comprising:

a plurality of base stations disposed throughout the geographic area, each base station having a radio frequency coverage area that defines a cell, each cell being preassigned one of a plurality of discrete, repetitive, periodic time slots during which the associated base station transmits signals in the cell, each base station further including means for receiving an acknowledge signal from the paging units;

a plurality of cluster controllers that direct paging message signals to one or more of the base stations;

a central computer system;

a communication link connecting the central computer system to the plurality of cluster controllers, the central computer system including means for producing a paging message signal and for directing the paging message signal to a cluster controller in order to be transmitted by a base station located within the geographic area;

wherein the central computer system further includes:

a) means for producing a locate signal and for directing the locate signal to the cluster controllers to be transmitted by the plurality of base stations located throughout the geographic area;

b) means for determining the closest base station to a paging unit based on the acknowledge signal received by the base stations;

c) means for transmitting an offset time to a paging unit that indicates the beginning of the time slot during which the paging message signal will be transmitted from a base station that, is closest to the paging unit; and d) means for directing the paging message signal to the base station that is closest to a paging unit so that the base station transmits the paging message signal to the paging unit at the time specified by the offset time.

18. A method for simultaneously transmitting paging messages to two or more paging units within a geographic area that is divided into a plurality of cells, comprising the steps of:

synchronizing a plurality of transmitters in the geographic area to a common time base;

dividing the time base into a plurality of discrete time slots;

preassigning each cell a plurality of the discrete time slots during which signals are transmitted in the cell, said signals being transmitted on a different frequency for each time slot preassigned to a cell, wherein said plurality of time slots are preassigned to the cells such that radio signals transmitted on the same frequency during the same time slot do not interfere;

transmitting a locate signals within all of the cells to the paging units in the geographic area;

transmitting an acknowledge signal from the paging units upon receipt of the locate signal;

receiving the acknowledge signals from the paging units and determining from the acknowledge signals the cells in which the paging units are located; and transmitting the paging messages to the paging units during the time slots(s) preassigned to the cells in which the paging units are located.

19. A method for transmitting paging messages to one or more paging units within a geographic area that is divided into a plurality of cells, each cell having an associated transmitter that transmits signals in a radio frequency coverage area, comprising the steps of:

synchronizing a plurality of transmitters in the geographic area to a common, repetitive time base;

dividing the time base into a plurality of discrete time slots;

preassigning each transmitter in the geographic area at least a first and a second of the plurality of discrete time slots during which the transmitter transmits radio frequency signals to a paging unit, preassigning to the associated transmitter of each cell either of a first or a second frequency on which the transmitter is to transmit during the first time slot and the other of the first or second frequency on which the transmitter is to transmit during the second time slot, wherein the preassignment is made such that no transmitters having overlapping radio frequency coverage areas transmit on the same frequency during the same time slot;

transmitting a locate signal within all of the cells to the one or more paging units in the geographic area;

transmitting an acknowledge signal from the paging units upon receipt of the locate signal;

receiving the acknowledge signals from the paging units and determining from the acknowledge signals the cells in which the paging units are located;

transmitting to the paging units an indication of the time slot and the frequency on which a paging message will be transmitted; and transmitting the paging messages to the paging units during one or more repetitions of the time slots preassigned to the transmitters associated with the cells in which the paging units are located.

* * * * *